United States Patent [19]

Geist et al.

[11] Patent Number: 4,548,965
[45] Date of Patent: Oct. 22, 1985

[54] WATER-DISPERSIBLE BINDERS FOR CATIONIC ELECTROCOATING FINISHES, AND PROCESS FOR THEIR PREPARATION

[75] Inventors: Michael Geist, Münster; Horst Diefenbach, Nottuln; Arnold Dobbelstein, Münster, all of Fed. Rep. of Germany

[73] Assignee: BASF Farben & Fasern AG, Hamburg, Fed. Rep. of Germany

[21] Appl. No.: 648,171

[22] PCT Filed: Jan. 5, 1985

[86] PCT No.: PCT/DE84/00003

§ 371 Date: Aug. 31, 1984

§ 102(e) Date: Aug. 31, 1984

[87] PCT Pub. No.: WO84/02712

PCT Pub. Date: Jul. 19, 1984

[30] Foreign Application Priority Data

Jan. 10, 1983 [DE] Fed. Rep. of Germany ....... 3300545

[51] Int. Cl.$^4$ .................. C09D 5/40; C08G 59/14; C09D 3/58; C09D 5/02
[52] U.S. Cl. .................. 523/456; 204/181.7
[58] Field of Search .................. 204/181 C; 523/456

[56] References Cited

U.S. PATENT DOCUMENTS 4,104,147 8/1978 Marchetti et al. ............ 204/181 C
4,148,772 4/1979 Marchetti et al. ............ 523/415

FOREIGN PATENT DOCUMENTS 59895   9/1982  European Pat. Off. ........ 204/181 C
2268059 11/1975 France ............................ 204/181 C
2338297  8/1977 France ............................ 204/181 C
1306101  2/1973 United Kingdom ............ 204/181 C Primary Examiner—Ronald W. Griffin
Attorney, Agent, or Firm—Wells & Wells

[57] ABSTRACT

The invention relates to water-dispersible binders for cationic electrocoating finishes, which are obtained by reaction of (A) epoxy resins containing low molecular weight aromatic groups and having an epoxide equivalent weight of less than 375 with (B) aliphatic and/or alicyclic polyfunctional alcohols or carboxylic acids having a number average molecular weight of less than 350, further reaction of the product of (A) and (B) with (C) a polyfunctional alcohol having a molecular weight of more than 350, addition at the epoxide groups taking place so that the reaction products of (A) and (B) contain an amount of aromatic groups of from 10 to 45% by weight, calculated as phenylene groups, and further modification of the resulting intermediate with (D) primary and/or secondary amines or ammonium salts in order to achieve the required water-dispersibility. The binders contain, as component (C), 5 to 40% by weight, based on the total binder, of a linear polyalkylene ether diol which has on average one terminal primary and one terminal secondary hydroxyl group per molecule and corresponds to the general formula

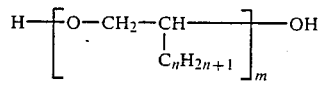

in which n denotes 1 to 4, preferably 1, and m denotes 4 to 35, preferably 5 to 20.

18 Claims, No Drawings

WATER-DISPERSIBLE BINDERS FOR CATIONIC ELECTROCOATING FINISHES, AND PROCESS FOR THEIR PREPARATION

BACKGROUND OF THE INVENTION

The present invention relates to a water-dispersible binder for cationic electrocoating finishes, obtained by reaction of (A) epoxy resins containing low molecular weight aromatic groups and having an epoxide equivalent weight of less than 375 with (B) aliphatic and/or alicyclic polyfunctional alcohols or carboxylic acids having a number average molecular weight of less than 350, further reaction of the product of (A) and (B) with (C) a polyfunctional alcohol having a molecular weight of more than 350, addition at the epoxide groups taking place so that the reaction products of (A) and (B) contain an amount of aromatic groups of from 10 to 45% by weight, calculated as phenylene groups, and further modification of the resulting intermediate with (D) primary and/or secondary amines or ammonium salts in order to achieve the required water-dispersibility.

It is known that cationic water-dispersible synthetic resins can be used as binders for electrocoating finishes. Thus, for example, German Offenlegungsschrift No. 2,701,002 describes a resin of this type, which is a reaction product of a polyepoxide having a molecular weight of at least 350, a secondary amine and an organic polyol containing at least two alcoholic primary hydroxyl groups. The resins are formed as a result of chain-lengthening of high molecular weight polyepoxides having at least two epoxide groups per molecule. Chain-lengthening is achieved by means of an organic polyol, and water-dispersibility is achieved by means of an addition reaction with a secondary amine.

This and other known synthetic resins for cathodic electrocoatings are frequently used for prime coats, ie. the articles coated with them receive an additional top coat. However, it is a disadvantage that only coatings having a relatively small layer thickness can be achieved with the resins known hitherto. Thus, German Offenlegungsschrift No. 2,701,002 states that layer thicknesses of only 11.4 to 18 μm can be achieved. When a coating is subject to particularly high requirements in respect of corrosion-resistance and surface quality, as is the case, for example, in the coating of automobiles and other high-quality goods, it has therefore been usual hitherto to apply a so-called filler as an additional layer between the electrocoating prime coat and the top coat. This is complicated and expensive. Hence, it is desirable to improve the electrocoating process so that greater layer thicknesses can be achieved in this process. In the attempt to increase the layer thickness, problems have resulted from the fact that, when the deposition voltage is increased above the breakdown voltage, surface irregularities occur in the film as a result of rupture of the layer. Increasing the coating time likewise results in an increase in the layer thickness; however, this increase cannot be continued as desired, since, because of the electrical resistance of the deposited film, there is normally an upper limit to the layer thickness, at which virtually no further increase in the layer thickness is achieved no matter how long coating is carried out.

German Offenlegungsschrift No. 3,108,073 corresponding to U.S. patent application Ser. No. 432,960, filed Sept. 27, 1982 discloses a water-dispersible binder for cationic electrocoating finishes which, when used, gives a deposited film which is relatively thick. Although this known binder gives coatings having excellent properties, it is nevertheless desirable to improve the flexibility of the resulting coatings by modifying the binder.

Surprisingly, it has now been found that coatings having improved properties in respect of flexibility are obtained if the binder used contains a proportion of a linear polyether diol which contains a secondary hydroxyl group in addition to a primary hydroxyl group.

The use of a diol containing primary and secondary hydroxyl groups in combination was not obvious since, on the basis of German Offenlegungsschrift No. 2,701,002, the skilled worker had to assume that exclusively diols with primary hydroxyl groups were suitable for the use in question. On page 10 of Offenlegungsschrift No. 2,701,002, it is stated that it is important for the alcoholic hydroxyl groups to be primary and not secondary or tertiary. Furthermore, the danger of gelling of the resin when diols having secondary hydroxyl groups are used is pointed out.

SUMMARY OF THE INVENTION

It is the merit of the present invention that it has overcome this prejudice by proposing the use of a diol which, in addition to a primary hydroxyl group, must possess a secondary hydroxyl group.

It is therefore the object of the present invention to provide a binder for cationic electrocoating finishes which, when used, gives coatings having great layer thickness coupled with great flexibility.

This object is achieved in accordance with the invention by a binder of the type mentioned at the outset by using, as component (C), 5 to 40% by weight, based on the sum of components (A), (B), (C) and (D), of a linear polyalkylene ether diol which has, on average, one terminal primary and one terminal secondary hydroxyl group per molecule and corresponds to the general formula

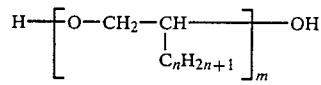

in which n denotes 1 to 4, preferably 1, and m denotes 4 to 35, preferably 5 to 20.

DESCRIPTION OF THE PREFERRED EMBODIMENTS

For component A—epoxy resins containing low molecular weight aromatic groups and having an epoxide equivalent weight of less than 375—polyepoxides are suitable. Polyepoxides which can be used in the present invention are materials which contain two or more epoxide groups in the molecule. Preferred compounds are those having two epoxide groups in the molecule. The polyepoxides have a relatively low molecular weight of not more than 750, preferably 400 to 500. The polyepoxides can be, for example, polyglycidyl ethers of polyphenols, such as bisphenol, advantageously, for example, bisphenol A. These polyepoxides can be prepared by etherification of a polyphenol with an epihalohydrin in the presence of an alkali. Examples of suitable phenol compounds are 2,2-bis(4-hydroxyphenyl)propane, 4,4'-dihydroxybenzophenone, 1,1-bis(4-hydroxyphenyl)ethane, 1,1-bis(4-hydroxyphenyl)isobutane, 2,2-bis(4-hydroxy-tert.-butylphenyl)propane, bis(2-hydroxynaphthyl)methane, 1,5-dihydroxynaphthalene and hydantoin epoxides.

Another suitable class of polyepoxides is polyglycidyl ethers of phenolic novolak resins.

Polyglycidyl esters of aromatic polycarboxylic acids can also advantageously be used.

Aliphatic and/or alicyclic polyfunctional alcohols or carboxylic acids having a molecular weight of less than 350 are employed as component B. Advantageously, these have a branched aliphatic chain, in particular with at least one neo structure.

Suitable compounds correspond to the following general formula:

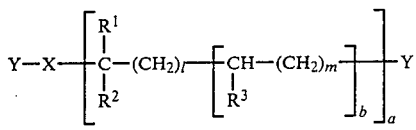

In this formula,
Y denotes OH or COOH
X denotes $(CH_2)_n$,

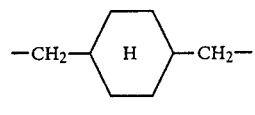

or

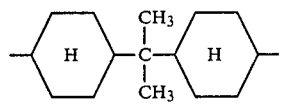

$R^1$, $R^2$ and $R^3$ denote H or an alkyl radical having 1 to 5 C atoms, a denotes zero or 1, b denotes zero or 1, 1 denotes zero–10 and m and n denote 1–10.

The following may be mentioned as examples: diols, such as ethylene glycol, diglycol, dipropylene glycol, dibutylene glycol, triglycol, propane-1,2-diol, propane-1,3-diol, 2,2-dimethylpropane-1,3-diol, 2,2-diethylpropane-1,3-diol, 2-methyl-2-ethylpropane-1,3-diol, 2-methyl-2-propylpropane-1,3-diol, 2-ethyl-2-butylpropane-1,3-diol, butane-1,2-diol, butane-1,4-diol, butane-2,3-diol, 2-ethylbutane-1,4-diol, 2,2-diethylbutane-1,3-diol, but-2-ene-1,4-diol, pentane-1,2-diol, pentane-1,5-diol, 3-methylpentane-1,5-diol, hexane-1,6-diol, hexane-2,5-diol, 2-ethylhexane-1,3-diol, 2,5-dimethylhexane-2,5-diol, octane-1,3-diol, nonane-4,5-diol, decane-2,10-diol, 2-hydroxyethyl hydroxyacetate, 2,2-dimethyl-3-hydroxypropyl 2,2-dimethylhydroxypropionate, 2-methyl-2-propyl-3-hydroxypropyl 2-methyl-2-propylhydroxypropionate, 4,4'-methylenebiscyclohexanol and 4,4'-isopropylidenebiscyclohexanol. A few preferred diols are 2,2-dimethylpropane-1,3-diol, 3-methylpentane-1,5-diol, 2,2-dimethyl-3-hydroxypropyl 2,2-dimethylhydroxypropionate and 4,4'-isopropylidenebiscyclohexanol.

Suitable carboxylic acids for component B include a large number of dicarboxylic acids, as described in U.S. patent application Ser. No. 432,960.

It is essential that the compounds of component B are reacted with component A in a ratio such that the reaction product has the stated content of 10 to 45%, calculated as phenylene groups, of aromatic groups.

Lengthening of the chain in the epoxy resin is effected by means of component C. The proportion of this component in the total binder is 3 to 40% by weight, based on the total binder. Polyalkylene ether diols which are suitable for component C correspond to the following formula:

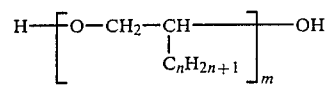

In the formula, n denotes 1 to 4 and m denotes 4 to 35. Very particularly preferred polypropylene glycols are those in which n has the value 1 and in which m has values from 5 to 20.

The amine used as component D for the reaction with the epoxide compound can be primary, secondary or tertiary, secondary amines being particularly suitable. Primary and secondary amines can be added directly at the epoxide ring, but tertiary amines can undergo addition only in the form of their ammonium salts or via a further functional group in the molecule. Preferably, the amine should be a water-soluble compound. Examples of such amines are mono- and dialkylamines, such as methylamine, ethylamine, propylamine, butylamine, dimethylamine, diethylamine, propylamine, methylbutylamine and the like. Other suitable compounds are alkanolamines, such as, for example, methylethanolamine, diethanolamine and the like. Dialkylaminoalkylamines, such as, for example dimethylaminoethylamine, diethylaminopropylamine and the like, are also suitable.

In most cases, low molecular weight amines are used, but it is also possible to use relatively high molecular weight amines, particularly when it is intended to increase the flexibility of the resin by incorporating such amines. In a similar manner, it is also possible to use mixtures of low molecular weight and high molecular weight amines for modifying the resin properties.

Polyamines containing primary and secondary amino groups can be reacted, in the form of their ketimines, with the epoxide groups. The ketimines are prepared from the polyamines in a known manner.

The amines may also contain other groups, but these should not interfere with the reaction of the amine with the epoxide group, and furthermore should not lead to gelling of the reaction mixture.

The reaction of the amine with the compound containing epoxide groups frequently takes place on mixing these materials. However, warming to moderately elevated temperatures, eg. to 50°–150° C., may be desirable, but reactions are also possible at lower and higher temperatures. Frequently, in order to terminate the reaction, it is advantageous to increase the temperature at least slightly for an adequate time towards the end of the reaction, in order to ensure complete conversion.

For the reaction with the epoxy-containing compound, the amine should be used in an amount which is at least sufficient for the resin to assume a cationic character, ie. for it to migrate to the cathode under the action of a potential in the coating bath, when the resin is rendered soluble by the addition of an acid. Essentially all the epoxide groups of the resin can be reacted with an amine. However, it is also possible to leave excess epoxide groups in the resin, these hydrolysing, on contact with water, to form hydroxyl groups.

A further possibility of achieving the required water-dispersibility consists in using, as component D, Mannich bases, ie. reaction products of suitable phenols (carrying groups capable of reaction with an epoxide ring) with formaldehyde and a secondary amine. This also makes the binder self-crosslinkable.

Furthermore, an addition reaction between the amines and the epoxy resins can take place via Tscherniac-Einhorn-Michael adducts. These adducts are prepared by the following synthetic route. First, phenols are reacted with methylol(meth)acrylamide to give the Tscherniac-Einhorn intermediate, and amines are then added at the double bonds. The end products can be reacted with the epoxide group of the binder via the phenol group.

Instead of the stated amines, or together with these, it is also possible to use the salt of an amine. As the salt of an amine, it is possible to use the salt of a tertiary amine. Acids which are suitable for neutralizing the amines and can be used in the present invention include boric acid or other acids having a dissociation constant larger than that of boric acid, preferably organic acids having a dissociation constant greater than about $1 \times 10^{-5}$. The preferred acid is acetic acid. Examples of other acids are formic acid, lactic acid, propionic acid, butyric acid, hydrochloric acid, phosphoric acid, sulfuric acid and carbonic acid.

The amine moiety of the amine-acid salt is an amine which may be unsubstituted or substituted, as in the case of hydroxylamine, but these substituents should not interfere with the reaction of the amine-acid salt with the polyepoxide, and should not cause the reaction mixture to gel. Preferred amines are tertiary amines, such as dimethylethanolamine, triethylamine, trimethylamine, triisopropylamine and the like. Examples of other suitable amines are stated in U.S. Pat. No. 3,839,252, in column 5, line 3, to column 7, line 42.

The amine-acid salt mixture is obtained by reaction of the amine with the acid in a known manner. Amine-acid mixtures can also be used, although, as a rule, they are reacted to form the acid salt.

The reaction temperature for the reaction of the amine-acid salts with the polyepoxides can be varied between the lowest temperature at which the reaction takes place with a significant velocity, eg. room temperature or, as a rule, somewhat above room temperature, and a maximum temperature between 90° and 120° C. A solvent is not required in the reaction, although it is frequently added in order that the reaction can be better controlled. Suitable solvents are aromatic hydrocarbons or monoalkyl ethers of ethylene glycol.

The specific starting materials, amounts and reaction conditions are chosen, on the basis of well known experience, so that gelling of the product during the reaction is avoided. Thus, for example, excessively harsh reaction conditions are not used. In a similar manner, starting materials having reactive substituents capable of reacting with the epoxide compounds are not used since they may have a disadvantageous effect on the reaction.

In order, using the binders according to the invention, to obtain highly resistant coatings, it is advantageous to add to the electrocoating finish a crosslinking agent which effects crosslinking of the binder at elevated temperatures, or to modify the binder so that it contains reactive groups which effect self-crosslinking at elevated temperatures. A self-crosslinking system can advantageously be obtained by reacting the binder with a partially blocked polyisocyanate which possesses, on average, one free isocyanate group per molecule, and whose blocked isocyanate groups are stable at room temperature and, at elevated temperatures, are deblocked and react with the hydroxyl groups formed by opening of the epoxide rings, to form a urethane. The binder may be crosslinkable as a result of using, as component D, the Mannich bases already described.

Frequently used methods for crosslinking binders have been published in, for example, the following Offenlegungsschriften: German Offenlegungsschrift No. 2,057,799, European Patent Application Nos. 12,463 and 4,090, and German Offenlegungsschrift No. 2,752,256.

When crosslinking agents are used, they make up, as a rule, about 5 to about 60% by weight of the binder. The preferred amount is about 20 to about 40% by weight of the binder.

Examples of suitable aminoplast crosslinking agents are the hexamethyl ethers of hexamethylolmelamine, the triethyl trimethyl ethers of hexamethylolmelamine, the hexabutyl ethers of hexamethylolmelamine and the hexamethyl ethers of hexamethylolmelamine, and polymeric butylated melamine/formaldehyde resins.

Urea-aldehyde crosslinking agents can be prepared in a known manner, by reacting urea and an aldehyde until the resole stage is reached, and alkylating the reaction product with an alcohol under acidic conditions, an alkylated urea/formaldehyde resin being obtained. An example of a suitable crosslinking agent based on a urea/aldehyde resin is a butylated urea formaldehyde resin.

It is also possible to use blocked polyisocyanate as crosslinking agents. In the invention, it is possible to use any desired polyisocyanates in which the isocyanate groups have been reacted with a compound so that the resulting blocked polyisocyanate is stable toward hydroxyl groups at room temperature, but reacts at elevated temperatures, as a rule in the range from about 90° to about 300° C. In the preparation of the blocked polyisocyanates, it is possible to use any organic polyisocyanates which are suitable for the crosslinking procedure.

Organic polyisocyanates which are suitable crosslinking agents for the invention can also be prepolymers which are derived from, for example, a polyol, including a polyether polyol or a polyester polyol.

For blocking the polyisocyanates, any suitable aliphatic, cycloaliphatic or aromatic alkyl monoalcohols can be used. Other suitable blocking agents are hydroxylamines.

The blocked polyisocyanates are prepared by reacting a sufficient amount of the blocking agent with the organic polyisocyanate, so that free isocyanate groups are no longer present. The reaction between the organic polyisocyanate and the blocking agent is exothermic. Hence, the polyisocyanate and the blocking agent are preferably mixed at a temperature which is no higher than 80° C., in particular lower than 50° C., in order to counteract the exothermic effect.

The invention also relates to a process for the preparation of a binder for cationic electrocoating finishes by reaction of (A) epoxy resins containing low molecular weight aromatic groups and having an epoxide equivalent weight of less than 375 with (B) aliphatic and/or alicyclic polyfunctional alcohols or carboxylic acids having a number average molecular weight of less than 350, further reaction of the product of (A) and (B) with (C) a polyfunctional alcohol having a molecular weight of more than 350, addition at the epoxide groups taking place so that the reaction products of (A) and (B) contain an amount of aromatic groups of from 10 to 45% by weight, calculated as phenylene groups, and further modification of the resulting intermediate with (D) primary and/or secondary amines or ammonium salts in order to achieve the required water-dispersibility, wherein, as component (C), 5 to 40% by weight, based on the sum of components (A), (B), (C) and (D), of a linear polyalkylene ether diol are employed which has on average one terminal primary and one terminal secondary hydroxyl group per molecule and corresponds to the general formula

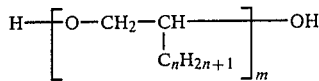

in which n denotes 1 to 4, preferably 1, and m denotes 4 to 35, preferably 5 to 20.

The process is carried out as follows: component A and component B are mixed, and are reacted completely at temperatures between 100° and 140° C., preferably 115° to 135° C., if appropriate with the addition of a catalyst. The reaction can be monitored on the basis of the epoxide equivalent weight. This reaction product of components A and B can, if required, be further modified at temperatures between 100° and 140° C. with component C. This reaction, too, can be monitored on the basis of the epoxide equivalent weight. The reaction product thus obtained still contains free epoxide groups.

For this reaction step, it is possible to use the same catalysts as for the reaction of components A and B. The reaction product thus obtained is reacted with component D at temperatures between 90° and 120° C., so that a binder which contains basic amino groups is formed. The basic reaction product can be completely or partially protonated by the addition of acids, and can then be dispersed in water. The crosslinking agent can be mixed with the binder before dispersing in water is carried out, or, depending on the reactivity, can be fed in during the preparation of the binder. Partially blocked polyisocyanates are reacted with the binder at temperatures between 80° and 150° C., preferably at temperatures between 100° and 130° C. The binders obtained constitute stable dispersions which are easy to handle. It may also be advantageous to dissolve the binders in suitable organic solvents before the preparation of the dispersion. Examples of suitable solvents are glycol ethers, ethylglycol, butylglycol, ketones, such as diethyl ketone, methyl ethyl ketone, methyl isobutyl ketone, and others.

The invention furthermore relates to the use of the binders for electrocoating baths.

The electrocoating baths can contain customary pigments. Frequently, a dispersant or a surfactant is added to the pigments. The pigment and any surfactant used are milled in some of the binder or alone in order to prepare a paste, which is diluted with the remaining binder to prepare the coating composition.

In some cases, it is advantageous to add a non-ionic modifier or solvent to the electrocoating bath in order to improve the dispersibility, the viscosity and or the film quality. Examples of such materials are aliphatic, naphthenic and aromatic hydrocarbons or mixtures of these; mono- and dialkyl ethers of glycols, Siberian pine needle oil and other solvents which are compatible with the resin system.

It is also possible to introduce other additives, such as antioxidants, into the electrocoating bath. Examples of these are ortho-amylphenol or cresol. The addition of such antioxidants is particularly desirable when the coating baths are exposed to atmospheric oxygen at elevated temperatures while stirring for relatively long periods.

Other additives which may be present in the bath are wetting agents, such as mineral oil sulfonates, sulfated fatty amines or their amides, alkylphenoxypolyethylenealkanols or phosphate esters, including oxyethylated alkylphenol phosphates. Other groups of possible additives are antifoams and suspending agents. The coating baths can be formulated using normal tap water. However, since such water contains relatively large amounts of salts, undesirable changes in the electrolytic deposition can occur. In general, therefore, demineralized water is preferred.

The above list of possible additives is not complete, since any other additives which do not interfere with the electrolytic deposition can be used.

The invention furthermore relates to a process for the electrophoretic coating of an electrically conductive substrate connected as the cathode, from an aqueous bath based on cationic binders which are at least partially neutralized with acids, the binders being obtained by reaction of (A) epoxy resins containing low molecular weight aromatic groups and having an epoxide equivalent weight of less than 375 with (B) aliphatic and/or alicyclic polyfunctional alcohols or carboxylic acids having a number average molecular weight of less than 350, further reaction of the product of (A) and (B) with (C) a polyfunctional alcohol having a molecular weight of more than 350, addition at the epoxide groups taking place so that the reaction products of (A) and (B) contain an amount of aromatic groups of from 10 to 45% by weight, calculated as phenylene groups, and further modification of the resulting intermediate with (D) primary and/or secondary amines or ammonium salts in order to achieve the required water-dispersibility, and the binders being rendered self-crosslinkable as a result of reaction, or the bath containing an additional crosslinking agent, wherein, as component (C), for the preparation of the binder, 5 to 40% by weight, based on the sum of components (A), (B), (C) and (D), of a linear polyalkylene ether diol are employed which has on average one terminal primary and one terminal secondary hydroxyl group per molecule and corresponds to the general formula

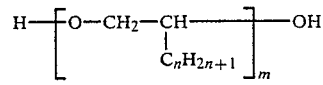

in which n denotes 1 to 4, preferably 1, and m denotes 4 to 35, preferably 5 to 20.

Any electrically conductive substrate can be used as the substrate for the electrolytic deposition. They are usually metal substrates, such as, for example, iron, steel, copper, zinc, brass, tin, nickel, chromium and aluminum, as well as other metals, pretreated metals, or phosphatized or chromatized metals. Impregnated paper and other conductive substrates can also be used.

In the cationic deposition, the articles to be coated are immersed in an aqueous dispersion of the solubilized film-forming cationic binder. An electrical voltage is applied between the article to be coated, which serves as the cathode, and an anode, and the electric current results in the cationic binder being deposited on the cathode. The article is then removed from the bath and is, as a rule, rinsed. The coating is then hardened in a conventional manner by heating.

SPECIFIC EXAMPLES

The examples which follow illustrate the invention. All parts and percentages are by weight, unless expressly stated otherwise.

PREPARATION OF A CROSSLINKING AGENT I

A reactor which is equipped with a heating device, a cooler, a stirrer, a thermometer, an outlet tube leading to a wash apparatus, and an apparatus for passing in nitrogen is charged with 12,280 parts of toluylene diisocyanate (a mixture of about 80% of toluene 2,4-diisocyanate and about 20% of toluylene 2,6-diisocyanate). Nitrogen is passed in, and the cooler is brought into action. 5,550.5 parts of 2-ethylhexanol are gradually added in the course of 5 hours, the temperature gradually rising to 50° C. While keeping the temperature at 50° C., a further 3,649.5 parts of 2-ethylhexanol are added in the course of 4 hours. The reaction mixture is kept at 50° C. for 75 minutes, after which the cooler is switched off, and 3.6 parts of dibutyl-tin dilaurate are added. The heating device is switched on, and the reaction mixture is heated to 65.6° C. in the course of 45 minutes. 3,184 parts of 1,1,1-trimethylolpropane are added in the course of 2 hours 50 minutes, the temperature increasing from 65.6° to 120° C. The reaction mixture is kept at this temperature for 90 minutes, after which 10,560 parts of 2-ethoxyethanol are added. The resulting product is a solution of a polyurethane crosslinking agent.

PREPARATION OF A CROSSLINKING AGENT II 2,340 g of the glycidyl ester of 2-methyl-2-ethylheptanoic acid are heated with 2,073 g of trimellitic anhydride to 130° C. in a reaction vessel. As a result, a strongly exothermic reaction begins. By means of external cooling, the reaction temperature is kept at 150° C. until an acid number of 183 is reached. The mixture is then cooled to 90° C., and 1,450 g of MIBK* are added. 835 g of propylene oxide are then slowly added dropwise. The reaction is terminated at an acid number of 2. The solids content of the resin solution is brought to 70% with further MIBK*.
*MIBK=methyl isobutyl ketone.

PREPARATION OF A GRAY PIGMENT PASTE 800 parts of butylglycol are added to 953 parts of a commercial epoxy resin based on bisphenol A and having an epoxide equivalent weight of 8%. The mixture is heated to 80° C. 221 parts of a reaction product of 101 parts of diethanolamine and 120 parts of 80% strength aqueous lactic acid are then added to the resin solution. The reaction is carried out at 80° C., until the acid number has fallen below 1.

1,800 parts of this product and 2,447 parts of demineralized water are initially introduced, and mixed with 2,460 parts of $TiO_2$, 590 parts of an extender based on aluminum silicate, 135 parts of lead silicate and 37 parts of carbon black. This mixture is comminuted to a Hegmann fineness of 5 to 7 in a milling unit. 1,255 parts of demineralized water are then added in order to achieve the desired paste consistency. This gray paste has a very long shelf life.

EXAMPLES 1 to 4

Preparation of the binders

The composition of the binders is shown in Table 1, and the exact weights of the components are listed in Table 2. The binders are prepared using the same recipe.

TABLE 1

| | Composition of the binders | | | |
|---|---|---|---|---|
| | Example 1 | Example 2 | Example 3 | Example 4 |
| Component B | Methylpropylpropane-1,3-diol | Neopentylglycol | Neopentylglycol | Dimethylmalonic acid |
| Component C | Polypropylene glycol OH number 187.8 | Polypropylene glycol OH number 187.8 | Polypropylene glycol OH number 123.5 | Polypropylene glycol OH number 187.8 |
| Crosslinking agent | 1 | 1 | 2 | 1 |
| Levelling agent | Phenylglycol | Phenylglycol | Hexylglycol | Hexylglycol |

TABLE 2

| | Weights for the preparation of the binders | | | |
|---|---|---|---|---|
| | Example 1 | Example 2 | Example 3 | Example 4 |
| Epoxy resin | 1063.5 | 1087.0 | 967.3 | 1061.6 |
| Component B | 186.7 | 150.3 | 133.8 | 186.4 |
| Xylene | 41.9 | 42.7 | 38.0 | 41.7 |
| Catalyst | 4.2 | 4.3 | 3.8 | 4.2 |
| Component C (95% strength solution) | 444.7 | 454.5 | 615.0 | 444.1 |
| Catalyst | 3.3 | 3.3 | 2.9 | 3.2 |
| Solution of crosslinking agent | 1287.4 | 1287.4 | 1287.3 | 1287.4 |
| Ketimine | 100.9 | 103.1 | 93.6 | 104.8 |
| Methylethanolamine | 83.6 | 85.4 | 76.0 | 83.4 |
| Levelling agent | 218.4 | 218.4 | 218.4 | 218.4 |
| $H_2O$ | 1866.9 | 1866.1 | 1865.6 | 1868.3 |
| Glacial acetic acid | 42.8 | 41.4 | 42.1 | 40.4 |
| Emulsifier | 66.5 | 66.5 | 66.5 | 66.5 |
| $H_2O$ | 2175.0 | 2175.0 | 2175.0 | 2175.0 |

TABLE 3

| Epoxide equivalent weight of the intermediates | | | | |
|---|---|---|---|---|
| Example | 1 | 2 | 3 | 4 |
| Stage 1 | 420 | 415 | 415 | 420 |

TABLE 3-continued

| | Epoxide equivalent weight of the intermediates | | | |
|---|---|---|---|---|
| Example | 1 | 2 | 3 | 4 |
| Stage 2 | 1130 | 1100 | 1280 | 1140 |

The epoxy resin based on bisphenol A (epoxide equivalent weight 188), component B and xylene are initially introduced into a 4 liter reactor, and heated to 125° C. Dimethylbenzylamine is then added, as a catalyst. The temperature is allowed to increase to 130° C., and the reaction is continued until the epoxide equivalent weight has reached stage 1 (Table 3). Thereafter, component C is added, together with 5% by weight (based on component C) of xylene, and a second amount of catalyst is added. The reaction is continued at 130° C., until the epoxide equivalent weight has reached stage 2 (Table 3). The solution of the crosslinking agent is then added, and the mixture is cooled to 90° C. (Example 3 is an exception: in this case, the crosslinking agent is added only after addition of the levelling agent, together with 55 g of lead octoate). The ketimine (reaction product of diethylenetriamine and methyl isobutyl ketone; 70% strength in methyl isobutyl ketone) and methylethanolamine are then added. The reaction temperature is allowed to increase to 120° C., and this temperature is maintained for 90 minutes. The levelling agent is then added, and is stirred in over 15 minutes. In the meantime, a dispersing bath is prepared from the first amount of water and glacial acetic acid and the emulsifier solution. The resin solution is dispersed therein. After 2 hours, the second amount of water is added, and this is mixed in over 30 minutes. The solids content of the dispersion is 35.5%.

The binder dispersions and the pigment pastes described above are used to prepare surface coating baths. This is done using 2,000 parts of water,
25 parts of 10% strength acetic acid,
1,920 parts of the dispersion,
775 parts of the paste and
280 parts of water.

The surface coating films are deposited at 27° C. in the course of 2 minutes. The zinc-phosphatized metal sheets are made the cathode, and are coated. The films deposited are hardened at 185° C. in the course of 20 minutes.

TABLE 4

| | Result of the deposition tests | | | |
|---|---|---|---|---|
| Example | 1 | 2 | 3 | 4 |
| Deposition voltage V | 250 | 280 | 270 | 290 |
| Film thickness μm | 47 | 36 | 33 | 31 |
| Crosshatch Adhesion | very good | very good | very good | very good |
| | very good | very good | very good | very good |
| Bending test | satisfactory | satisfactory | satisfactory | satisfactory |
| Flow | very good | very good | very good | very good |

What we claim is:

1. In a water-dispersible binder for cationic electrocoating finishes comprising the reaction products of:
   (A) low molecular weight epoxide resins containing aromatic groups and having an epoxide equivalent weight of below 375;
   (B) a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols, whereby from (A) and (B) a first reaction product is obtained, containing 10–45% of aromatic groups, calculated as phenylene groups;
   (C) 5 to 40% by weight, relative to the total binder of a second polyfunctional compound having a molecular weight greater than 350; and
   (D) an amine compound selected from the group consisting of amines, salts of amines, a sulfide/acid mixture and a phosphine/acid mixture, the improvement comprising:
   said component (C) comprising a linear polyalkylene ether diol having on average one terminal primary and one terminal secondary hydroxyl group per molecule and corresponding to the general formula

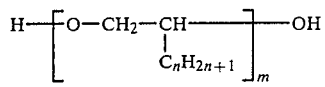

wherein n is 1 to 4 and m is 4 to 35.

2. The binder of claim 1, wherein n is 1 and m is 5 to 20.

3. The binder of claim 1, wherein the proportion of component (C) is 10 to 30% by weight, based on the sum of components (A), (B), (C) and (D).

4. The binder of claim 1, wherein at least some of the hydroxyl groups have been reacted with a partially blocked isocyanate.

5. The binder of claim 1, wherein component (A) is an epoxy resin having bisphenol A as a component.

6. The binder of claim 1, wherein component (A) is a polyglycidyl ester.

7. The binder of claim 1, wherein component (B) is a diol or a dicarboxylic acid having a branched aliphatic chain.

8. The binder of claim 1, wherein component (B) is a diol or a dicarboxylic acid having at least one neo structure.

9. In a process for preparing binders for cationic electrocoating finishes, comprising reacting:
   (A) low molecular weight epoxy resins containing aromatic groups and having an epoxide equivalent weight of below 375 with
   (B) a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols, to produce a first reaction product containing a proportion of aromatic groups, calculated as the phenylene group, of 10–45%, and further modifying said first reaction product with
   (C) 5 to 40% by weight relative to the total binder of a second polyfunctional compound having a molecular weight greater than 350; and
   (D) an amine compound selected from the group consisting of amines, salts of amines, a sulfide/acid mixture and a phosphine/acid mixture to obtain dispersibility in water, the improvement comprising:

said component (C) comprising a linear polyalkylene ether diol having on average one terminal primary and one terminal secondary hydroxyl group per molecule and corresponding to the general formula

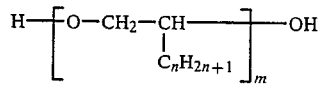

wherein n is 1 to 4 and m is 4 to 35.

10. The process of claim 9, wherein n is 1 and m is 5 to 20.

11. The process of claim 9, wherein the proportion of component (C) is 10 to 30% by weight, based on the sum of components (A), (B), (C) and (D).

12. In a process comprising the step of electrophoretically coating an electrically conductive substrate connected as the cathode with an electrically resistant high layer thickness film from an aqueous bath based on cationic binders, wherein the binders are reaction products of components (A), (B), (C) and (D), said reaction products produced by reacting in a first step:

said component (A) comprising low molecular weight epoxide resins containing aromatic groups and having an epoxide equivalent weight of below 375; and said component (B) comprising a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols to roduce a first intermediate reaction product containing 10 to 45% of aromatic groups, calculated as the phenylene groups, said first intermediate reaction product of said components (A) and (B) reacted with:

said component (C) comprising 5 to 40% by weight, relative to the total binder of a second polyfunctional compound having a molecular weight greater than 350;

to produce a second intermediate reaction product and reacting said second intermediate reaction product in a third step with:

said component (D) comprising an amine compound selected from the group consisting of amines, salts of amines, a sulfide/acid mixture and a phosphine/acid mixture, the improvement comprising:

said component (C) comprising a linear polyalkylene ether diol having on average one terminal primary and one terminal secondary hydroxyl group per molecule and corresponding to the general formula

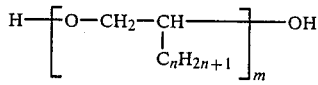

wherein n is 1 to 4 and m is 4 to 35.

13. The process of claim 12, wherein n is 1 and m is 5 to 20.

14. The process of claim 12, wherein said aqueous bath contains a completely blocked polyisocyanate as the cross-linking agent.

15. The process of claim 12, wherein the proportion of component (C) is 10 to 30% by weight, based on the sum of components (A), (B), (C) and (D).

16. The process of claim 12, wherein the aqueous bath contains, as the cross-linking agent, an organic compound having terminal ester groups capable of transesterification, amidation, or both of which at least one is activated by I substituents in the ester alcohol.

17. The process of claim 12, wherein the bath contains a cross-linking agent which contains hydroxyalkyl ester groups, carbalkoxymethyl ester groups, or mixtures thereof.

18. A coated substrate produced by the process of claim 12.

* * * * *